July 27, 1965 L. PORZKY 3,196,540
HEDGE SHEARS WITH PRUNER NOTCH
Filed Feb. 14, 1963
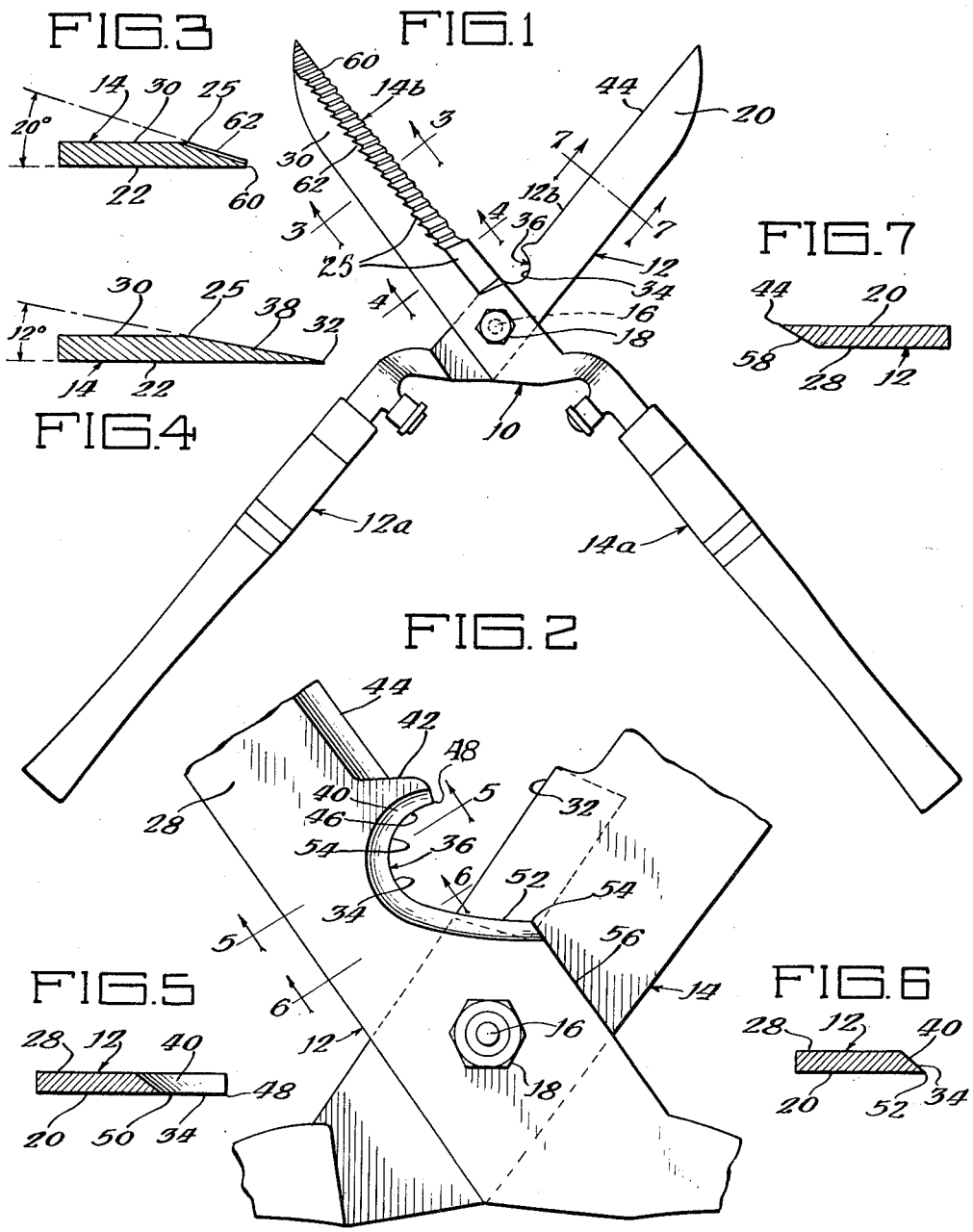
Inventor:
Leonhard Porzky
By: Hofgren, Wegner, Allen,
Stellman & McCord
Attorneys United States Patent Office 3,196,540
Patented July 27, 1965

3,196,540
HEDGE SHEARS WITH PRUNER NOTCH
Leonhard Porzky, Watertown, Wis., assignor to Village Blacksmith Corporation, a corporation of Delaware
Filed Feb. 14, 1963, Ser. No. 258,460
2 Claims. (Cl. 30—254)

This application is a continuation-in-part of my copending application, Serial No. 183,250, filed March 28, 1962, and now abandoned. This invention relates to shears for use in trimming hedges, tree limbs and the like and, more particularly, to a pruning notch for and a part of such shears.

Conventional trimming shears are generally scissor-like devices consisting of two pivotally secured blades and are adapted to cut by means of the shearing action of relatively blunt edges of the blades passing one another in facial engagement. Of the two blades in a pruning tool, one is usually a cutting blade having a sharpened edge and the other is usually a holding blade having a complementary blunt edge, past which the sharp blade moves to cut the object, such as a limb, being held against the blunt edge. The cutting effectiveness on small limbs is enhanced in a device wherein both blades are provided with relatively blunt faces acting in a shearing function. However, in the case of relatively larger limbs and the like which must be cut by pruning shears, a holding edge is necessary to prevent the shears from twisting in the direction of the longitudinal extent of the limb as the cutting force is applied thereto.

Since a shears cuts by the passing of one blade past another and is best for trimming bushes, hedges and twig-sized limbs, the blades preferable are formed differently from the blades of a pruning tool in which at least one blade should have a sharp, penetrating, wedge-shaped, limb-engaging part. While a hedge shears has handles sufficient to give leverage for pruning operations, the requirements of hedge shear blades for best efficiency have been opposed to the best requirements of pruning tools.

It is therefore a primary object of this invention to provide a new and improved pruning device.

It is another object of this invention to provide a new and improved pruning device comprising a pair of pivotally mounted sharpened blades, one of the blades having a hook-shaped holding surface for embracing the object to be cut thereby.

It is still another object of this invention to provide a new and improved pruning device comprising a pair of pivotally secured blades, one of said blades having an arcuate cutting edge with an extremity curving toward the opposite blade, the shortest distance from the extremity to the opposite blade being less than the shortest distance from other portions of the arcuate cutting edge to the opposite blade.

Another object is to provide a single economically manufactured tool combining both shearing quality and pruning quality in a single tool.

It is yet another object of this invention to provide a new and improved pruning device comprising a pair of pivotally secured blades, each of the blades having a sharp cutting edge adjacent the pivot, a hook-shaped holding cavity formed in one of the blades in the area adjacent the pivot with a portion protruding outwardly from the normal blade edge so that a line drawn through the center of the pivotal mounting of the two blades and a limb embraced by the holding portion and the opposite blade intersects the aforementioned protrusion.

Other objects, features and advantages of the present invention will be apparent from the following description of the preferred embodiment illustrated in the accompanying drawings, in which:

FIGURE 1 is a top plan view of shears having the pruning blade portions of this invention;
FIGURE 2 is an enlarged fragmentary plan view of the opposite side of a portion of the device of FIGURE 1;
FIGURE 3 is a section view taken along the line 3—3 of FIGURE 1;
FIGURE 4 is a section view taken along the line 4—4 of FIGURE 1;
FIGURE 5 is a section view taken along the line 5—5 of FIGURE 2;
FIGURE 6 is a section view taken along the line 6—6 of FIGURE 2; and
FIGURE 7 is a section view taken along the line 7—7 of FIGURE 1.

The pruning shears 10 of this invention consists of two metal blades 12 and 14 which are pivotally mounted as at 16 by means of a bolt or other suitable fastening device 18. The blades 12 and 14 have suitable handle portions 12a and 14a for grasping the shears 10 to swing the blades about the pivot 16 for cutting either in shearing or pruning function.

The blades 12 and 14 have inner faces 20 and 22, respectively, and outer faces 28 and 30, respectively. The inner faces 20 and 22 are in generally the same plane so that they slide in facial engagement between the blades 12 and 14 when the blades are swung about the pivot 16.

Adjacent the pivot 16 the blades 12 and 14 are provided with pruning cutting edges 32 and 34 on the interior of the angle formed by the intersection of the two blades. The cutting edge 32 of the blade 14 is relatively straight. Blade 12 is provided with a generally hook-shaped holding and cutting cavity 36 which includes the cutting edge 34. Both cutting edges have beveled sharpened positions for simultaneous cutting with most of the cutting being performed by blade 14. Beveled surface 38 on blade 14 is on the outer face to form the cutting edge 32. Beveled surface 40 of in excess of 12° on blade 12 extends along the curved cutting edge 34 and is on the outer side of the blade. Each cutting edge is formed in the plane of the inner faces of the blades respectively.

In manufacturing the blade 10, a forging will be provided with a bevel of 10° to 12°, the latter being shown in FIGURE 4. This bevel will extend over the entire length of the blade and will extend from the face 22 across the thickness of the blade 10 to the line of intersection 25 with the face 30. The line of intersection 25 extends over the entire length of the blade 10 throughout the pruning and shearing parts of the blade. The pruning surface portion 38 is ground to sharpness and the grinding tool may run out over the shearing section of the blade without touching the shearing section already machined to provide the more blunt bevel of 20° and provided with the serrated surface 62. It has been found that a bevel on the pruning section should be 10° to 12° and no more than about 12° for efficient pruning action. Yet, the shearing action on small limbs, etc. is better performed by a more blunt blade such as the 20° bevel with its face 60 so that in cooperation with the opposite blade, there will be a true shearing action. The combination of the two bevels on a single blade may efficiently be made as described without weakening the blade next to the pivot.

In the present invention, the curved cutting blade has a special shape for retaining a limb in the pruning section. The cavity 36 is formed in part by a protrusion or nose portion 42 which protrudes beyond the edge 44 of blade 12 generally perpendicular thereto and toward blade 14 for embracing a limb or the like therein. The cutting edge 34 on the interior of the nose 42 extends rearwardly in a slightly hooked line 46 from the point or extremity 48. The edge 34 then assumes an arcuate configuration 50 from which it progresses to a generally straight line 52 terminating at the rear point 54 at its intersection with the pivot portion edge 56 of the blade 12.

The configuration of the cavity 36 is such that the shortest distance on a line drawn from any point near the free extremity on the cutting edge of the blade 12 perpendicular to the blade 14 is between point 48 on the hook of nose 42 and the straight cutting edge 32 on blade 14. When a limb or the like is held by the cavity 36 so that a portion of the circumference of the limb is in tangential contact with the edge 32 of blade 14, a line drawn through the centers of pivot 16 and the center of the limb will intersect the blade 12 in the nose portion 42. These two characteristics of the nose portion 42 provide the cavity 36 with a more complete limb entrapment surface. Limbs which might normally tend to slip from restraint in a cavity which did not have such a nose portion are maintained within the grasp of the cavity.

The interior configuration of cavity 36 cooperates with the protrusion of nose 42 to sufficiently grasp a limb and hold it against movement along the length of the blades while allowing the cutting edges to cut the limb without causing the shears to twist in the direction of the longitudinal extent of the limb. When a limb is first grasped in the cavity 36, it rests generally in the portion defined by the straight base edge 52 of the curved cutting edge 34. As the blades 12 and 14 are brought together in the cutting action, the limb, aided by force from the cutting edge 32 of blade 14, tends to move upward in the direction of the longitudinal extent of blade 12. Thus it occupies that portion of the cavity 36 defined by the arcuate edge 50 and the hook edge 46 of the nose 42 and is in tangential contact with a portion of edge 32. Further upward movement of the limb is prevented by the nose 42 which extends outwardly beyond the side 44 of blade and hooks slightly in its interior edge 46.

The remainder of the pruning shears 10 possesses the conventional configuration for devices of this type. As shown in FIGURE 7, the remaining portion 12b of the blade 12 has a stright sharp cutting edge 44 which possesses a bevel 58 in excess of 12° extending from the edge 44 to the outer face 48. As shown in FIGURE 3, the remaining portion 14b of the blade 14 has a blunt holding edge 60 and a serrated bevel of about 20° extending from the blunt edge 60 to the outer face 30 for aiding the holding and hearing action of the blunt edge 60.

The fact that the nose portion 42 is intersected by a line drawn through the common centers of a pivot 16 and a limb grasped in the cavity 36 in tangential contact with the edge 32 provides an effective retaining device which holds the limb within the cavity 36 against movement along the longitudinal extent of the blades 12 and 14 when the blades are brought together in the cutting action. The combination of the unique shape of the holding cavity 36 with the provision that the curved cutting edge 34 and the opposite edge 32 have sharp cutting edges allows both blades to cut simultaneously into comparatively larger limbs. Tests show that a five-eighths inch maple dowel is cut about sixty percent by the straight edge 32 and forty percent by the curved edge 34. Also, because both the holding cavity 36 and the opposite edge 32 possess sharp cutting edges, no increase in force or fulcrum length is necessary to cut larger limbs with shears of the same size.

While I have shown and described certain embodiments of my invention, it is to be understood that it is capable of many modifications. Changes, therefore, in the construction and arrangement may be made without departing from the spirit and scope of my invention as set out in the appended claims.

I claim:

1. A pruning and shearing tool, comprising: a pair of metal blades pivotally secured together, a flat inner face on each of the blades extending from the pivot to the outer extremity, said blades having bevels respectively formed on the outer faces thereof forming edges in said flat faces for cutting limbs and the like, one of said blades having a pair of cutting edges and a bevel surface intersecting the outer face of the blade along a straight line extending over the length of the blade opposite both said cutting edges, said bevel surface adjacent the pivot providing a straight cutting edge with an included angle of no more than 12° in said bevel and the balance of said blade providing a shearing edge with an included angle of more than 12°, the other blade having a shear edge with an arcuate limb holding edge opposite said straight cutting edge with an extremity extending beyond the general edge of the blade whereby to restrain an object held by the arcuate edge from movement along the longitudinal extent of the blades when the latter are brought together for lopping a limb or the like.

2. A pruning cutter notch for shears, comprising: a pair of metal blades pivotally secured together, a flat inner face on each of said blades adjacent the pivot, said faces being opposed relative to each other for mutual sliding engagement; a beveled cutting edge on each of said blades adjacent the pivot, said beveled edge providing a sharp cutting edge in the plane of the inner faces, one blade having two distinct bevels intersecting the outer face of the blade along a common line extending lengthwise of the blade, one bevel adjacent the pivot being not greater than 12° and the bevel adjacent the extremity of the blade being greater than 12°, said bevel adjacent the pivot having a straight cutting edge, the other blade having an arcuate cutting edge with blocking means for restraining an object held by said arcuate cutting edge against movement along the longitudinal extent of said arcuate cutting edge blade when said blades are brought together for cutting, said blocking means comprising an extremity extending beyond the normal edge of the blade whereby a line drawn through the center of said pivot and the center of an object held by said arcuate cutting edge in tangential contact with said straight cutting edge intersects said extremity.

References Cited by the Examiner

UNITED STATES PATENTS

| | | | |
|---|---|---|---|
| 1,507,225 | 9/24 | Barrett | 30—249 |
| 1,520,529 | 12/24 | Cagle | 30—254 |
| 1,522,841 | 1/25 | Siefken | 30—249 X |
| 1,607,470 | 11/26 | McKenney | 30—252 |
| 1,610,015 | 12/26 | Kozma | 30—249 |
| 2,191,236 | 2/40 | McDonald | 30—254 |

FOREIGN PATENTS 849,399   9/60   Great Britain.

WILLIAM FELDMAN, *Primary Examiner.*